US012616091B2

(12) United States Patent  
Wang

(10) Patent No.: US 12,616,091 B2  
(45) Date of Patent: May 5, 2026

(54) METHOD AND APPARATUS FOR HEIGHT ADJUSTABLE HANDLES FOR MOWER

(71) Applicant: Havener Enterprises, Inc., Bradley, IL (US)

(72) Inventor: Siming Wang, Guangzhou (CN)

(73) Assignee: HAVENER ENTERPRISES, INC., Bradley, IL (US)

( * ) Notice: Subject to any disclaimer, the term of this patent is extended or adjusted under 35 U.S.C. 154(b) by 279 days.

(21) Appl. No.: 18/377,906

(22) Filed: Oct. 9, 2023

(65) Prior Publication Data

US 2024/0114829 A1 Apr. 11, 2024

Related U.S. Application Data

(60) Provisional application No. 63/414,701, filed on Oct. 10, 2022.

(51) Int. Cl.
| | |
|---|---|
| B62D 1/12 | (2006.01) |
| A01D 34/82 | (2006.01) |
| A01D 101/00 | (2006.01) |

(52) U.S. Cl.
CPC ........ A01D 34/824 (2013.01); *A01D 2101/00* (2013.01)

(58) Field of Classification Search
CPC .............. A01D 34/824; A01D 2101/00; A01D 2034/6843; A01D 34/006; B62D 1/12
USPC .................................................. 280/47.371
See application file for complete search history.

(56) References Cited

U.S. PATENT DOCUMENTS

| | | | | |
|---|---|---|---|---|
| 5,822,961 | A * | 10/1998 | Busboom ........... | A01D 34/6806 56/11.4 |
| 6,442,917 | B1 * | 9/2002 | Velke ................. | A01D 34/6806 56/14.7 |
| 7,226,396 | B2 * | 6/2007 | Buechel, Jr. ....... | A63B 21/4035 482/148 |
| 7,325,388 | B2 * | 2/2008 | Wright .................. | A01D 69/03 56/17.1 |
| 7,467,677 | B2 * | 12/2008 | Barrier ................ | A01D 34/824 180/6.32 |
| 7,712,294 | B2 * | 5/2010 | Wright .................. | A01D 34/74 56/16.3 |
| 8,087,481 | B2 * | 1/2012 | Trefz .................... | A01D 34/64 180/332 |
| 8,522,901 | B1 * | 9/2013 | VanLue ................. | B62D 11/04 56/15.8 |
| 8,887,841 | B2 * | 11/2014 | Oswald .................. | A01D 34/82 180/6.48 |
| 10,099,714 | B2 * | 10/2018 | Oswald ................ | A01D 34/001 |
| 11,357,170 | B1 * | 6/2022 | Funk ...................... | B62D 11/02 |

(Continued)

*Primary Examiner* — James A Shriver, II  
*Assistant Examiner* — Hilary L Johns  
(74) *Attorney, Agent, or Firm* — KNECHTEL, DEMEUR & SAMLAN

(57) ABSTRACT

Adjustable handles that are uniquely designed and mounted to a self-propelled lawn mower to improve and accommodate the different operating requirements by the operator standing on a sulky device or in a walking position behind the lawn mower. The adjustable handles comprise a front handle, a left control handle lever, a right control handle lever, and a back handle, each individually adjustable and releasably fixed to the same opposed supports or plates fixedly secured to the lawn mower.

13 Claims, 6 Drawing Sheets

(56)         References Cited

U.S. PATENT DOCUMENTS

| | | | |
|---|---|---|---|
| 2004/0192516 A1* | 9/2004 | Buechel, Jr. ..... | A63B 21/00047 |
| | | | 482/68 |
| 2005/0183409 A1* | 8/2005 | Barrier ................... | A01D 69/03 |
| | | | 56/11.9 |
| 2007/0039304 A1* | 2/2007 | Wright ................... | A01D 34/74 |
| | | | 56/14.9 |
| 2007/0044446 A1* | 3/2007 | Wright ................... | A01D 69/03 |
| | | | 56/11.9 |
| 2008/0034723 A1* | 2/2008 | Wright ................... | A01D 34/74 |
| | | | 56/17.1 |
| 2010/0242176 A1* | 9/2010 | Newkirk .............. | A61G 7/0524 |
| | | | 5/602 |
| 2011/0278088 A1* | 11/2011 | Weihl ....................... | B62D 1/02 |
| | | | 280/779 |
| 2013/0074466 A1* | 3/2013 | Zwieg ................... | A01D 34/74 |
| | | | 56/14.7 |
| 2016/0219784 A1* | 8/2016 | Arvidsson ............ | A01D 34/824 |
| 2024/0081178 A1* | 3/2024 | Wang .................... | A01D 34/74 |

* cited by examiner 56, 92

42, 78

52, 88

44, 80

46, 82

54, 90

66, 98

58

62, 94

60

50, 86

64, 96

28, 34

48, 84

52

METHOD AND APPARATUS FOR HEIGHT ADJUSTABLE HANDLES FOR MOWER

I. CROSS-REFERENCE TO RELATED APPLICATION

This patent application is a non-provisional application claiming priority from U.S. Provisional Patent Application Ser. No. 63/414,701, entitled "Method and Apparatus For Height Adjustable Handles For Mower", filed on Oct. 10, 2022, and is fully incorporated herein by reference.

II. FIELD OF THE INVENTION

The present invention relates to self-propelled, stand-on lawn mowers and, more particularly, to adjustable handles that are uniquely designed and mounted to the lawn mower to improve and accommodate the different operating requirements by the operator when the lawn mower is in use.

III. BACKGROUND OF THE INVENTION

Self-propelled, stand-on lawn mowers have been known in the art, for a very long time. In all of that time, the currently available lawn mowers are provided with or include a standing platform where the operator typically stands to operate the lawn mower. In this manner, the operator moves with the lawn mower and operates all of lawn mower from the standing platform. Alternatively, the operator could desire to operate the self-propelled lawn mower, with the standing platform folded in the up position, to therefore be able to walk behind and operate the lawn mower from that walking position.

These standing platforms are positioned behind the lawn mower and situated at a height above the ground to create a suitable or desired ground clearance but, once in that position, are fixed at this height to the lawn mower. Additionally, the gears and levers and, of course, the various handles, are likewise fixed in their position with these lawn mowers. As the operator standing on the standing platform or walking behind (both in fixed positions) and have to operate the lawn mower using the gears and levers and various handles (which are in fixed positions), this presents a problem for operators of taller and shorter heights as these operators are situated at awkward or inconvenient positions in relation to, for example, the fixed various handles in order to be able to operate them. Due to the speeds of self-propelled lawn mowers and moveability, some accommodating a 360 degree rotations, this likewise presents a safety concern to these operators.

Thus, there is a need, therefore, and there has never been disclosed Applicant's unique adjustable handles invention for lawn mowers.

IV. SUMMARY OF THE INVENTION

The present invention is adjustable handles that are uniquely designed and mounted to a self-propelled lawn mower to improve and accommodate the different operating requirements by the operator standing on a sulky device or in a walking position behind the lawn mower. The adjustable handles comprise a front handle, a left control handle lever, a right control handle lever, and a back handle, each individually adjustable and releasably fixed to the same opposed supports or plates fixedly secured to the lawn mower.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
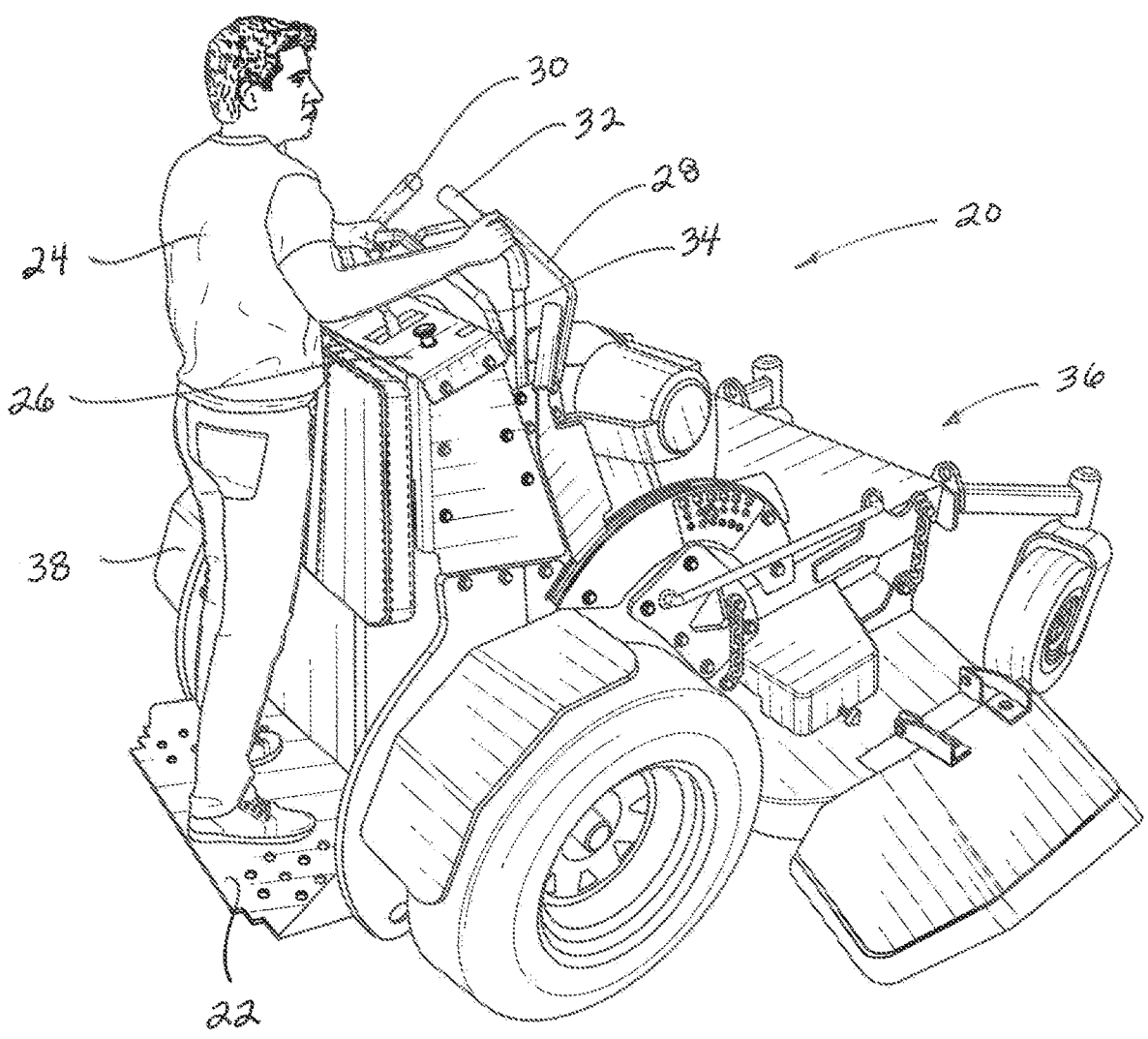
FIG. 1 is a perspective view of the self-propelled lawn mower and Applicant's inventive adjustable handle design.

Turning first to FIG. 1, there is illustrated a self-propelled lawn mower ("lawn mower") 20 having an operator console 26 with a sulky device ("sulky") 22 and further showing an operator 24 standing on the sulky 22 and operating the lawn mower 20 from this position adjacent to the operator console 26. For purposes of this patent application, the lawn mower 20 may be any type of and, operate in the same manner as any, self-propelled lawn mower or any lawn mower that is operated with the operator 24 situated behind the lawn mower while in use that is known to one skilled in the art. To accomplish Applicant's invention, and as further described in more detail below, the lawn mower 20 is provided with a front handle 28, a left control handle lever 30, a right control handle lever 32, and a back handle 34 in which the height position of these components can be adjusted.

The lawn mower 20 has a front end 36 and a rear end 38 with the operator console 26 and operating handles (e.g., collectively referred to herein as, the front handle 28, the left control handle lever 30, the right control handle lever 32, and the back handle 34) situated between the front end 36 and the back end 38. In the preferred embodiment, the operator 24 is standing on the sulky 22 adjacent the rear end 28 of the lawn mower 20 and leans against a stabilizer 40 fixedly in the vertical orientation relative to the lawn mower 20 and secured to the lawn mower 20 so that the operator 24 can lean against this stabilizer 40 when operating the lawn mower 20, specifically, the operator console 26 and operating handles.

Figure 2:
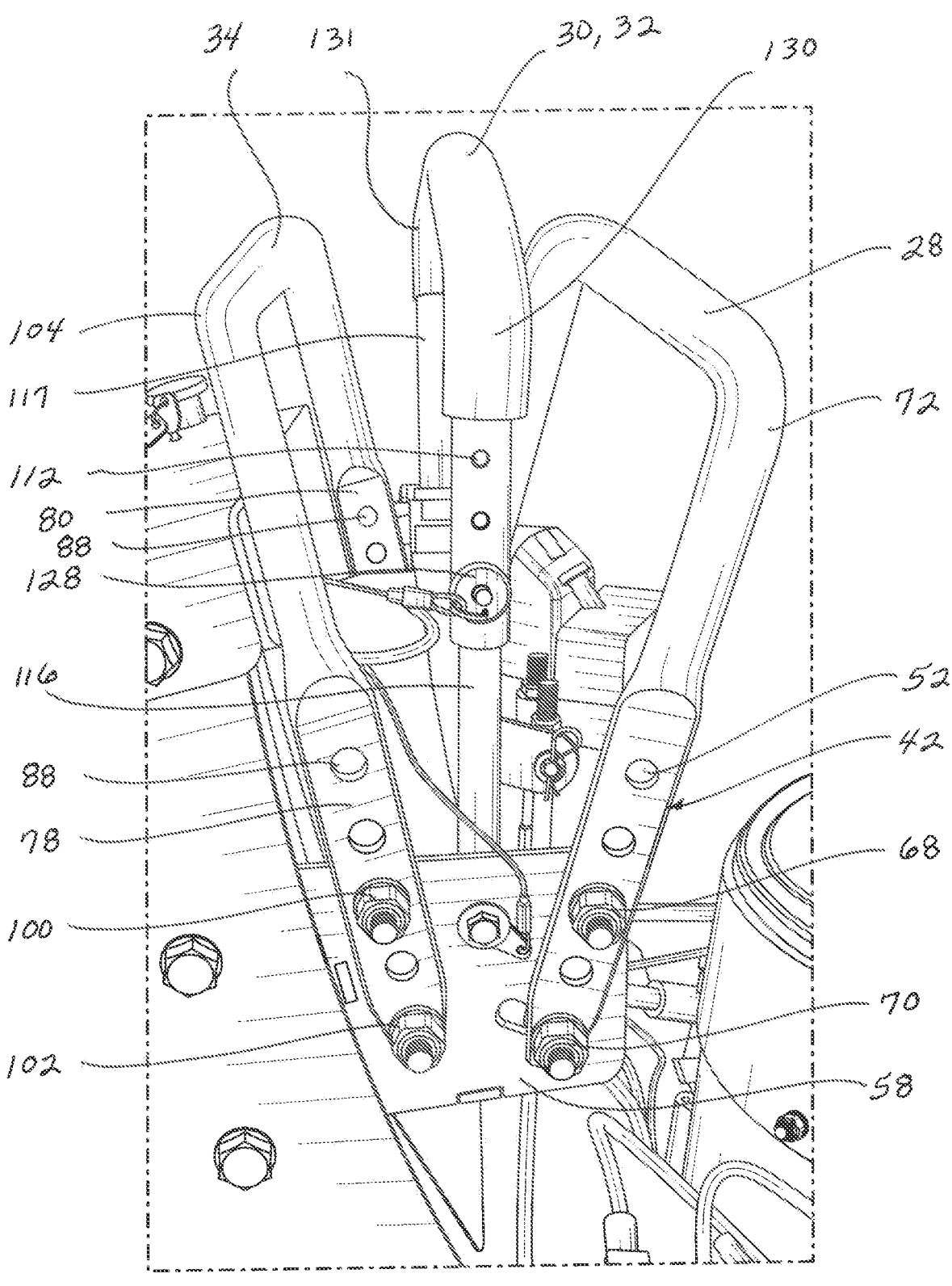
FIG. 2 is a side perspective view, with portions removed, of Applicant's inventive adjustable handle design and, in particular, illustrating the front handle, the right control lever, the left control lever, and the back handle, each as fixedly secured to the self-propelled lawn mower each in a first height position.
Figure 3:
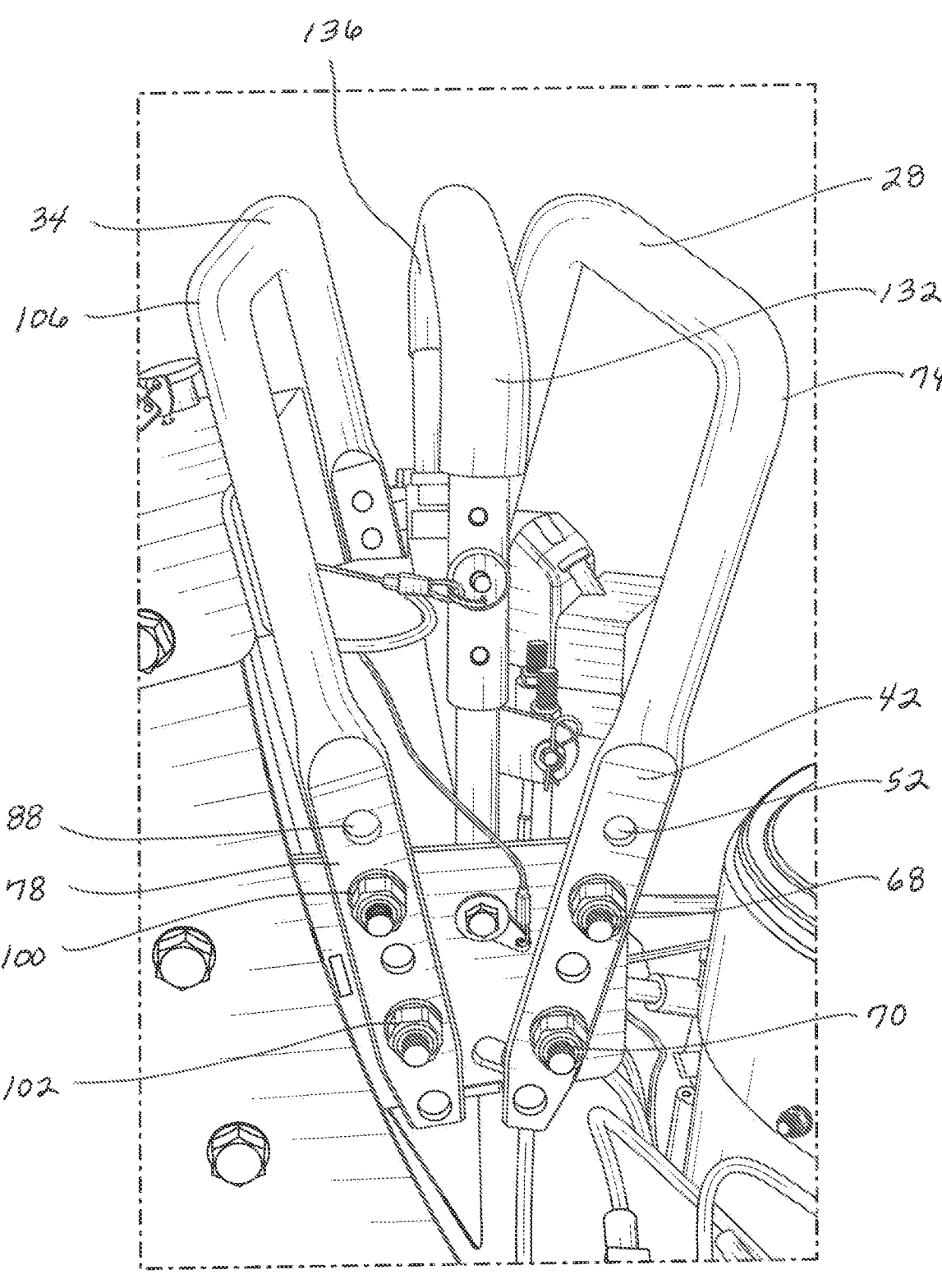
FIG. 3 is a side perspective view, with portions removed, of Applicant's inventive adjustable handle design and, in particular, illustrating the front handle, the right control lever, the left control lever, and the back handle, each as fixedly secured to the self-propelled lawn mower each in a second height position.
Figure 4:
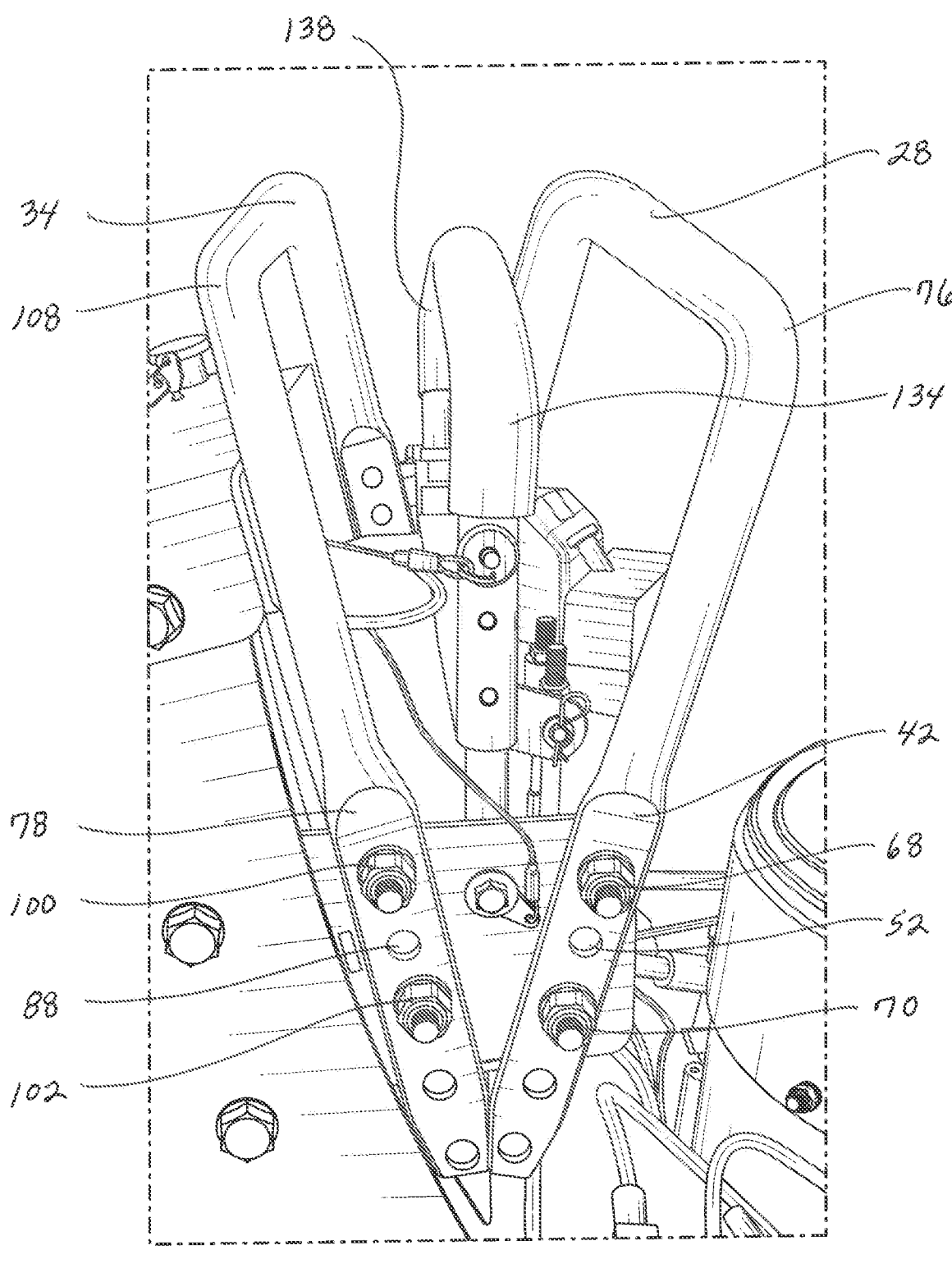
FIG. 4 is a side perspective view, with portions removed, of Applicant's inventive adjustable handle design and, in particular, illustrating the front handle, the right control lever, the left control lever, and the back handle, each as fixedly secured to the self-propelled lawn mower each in a third height position.

In the preferred embodiment, each of the operating handles, specifically, the front handle 28, the left control handle lever 30, the right control handle lever 32, and the back handle 34 are height adjustable, as shown in differing height, positions as illustrated in FIGS. 2 through 4.

Figure 5:
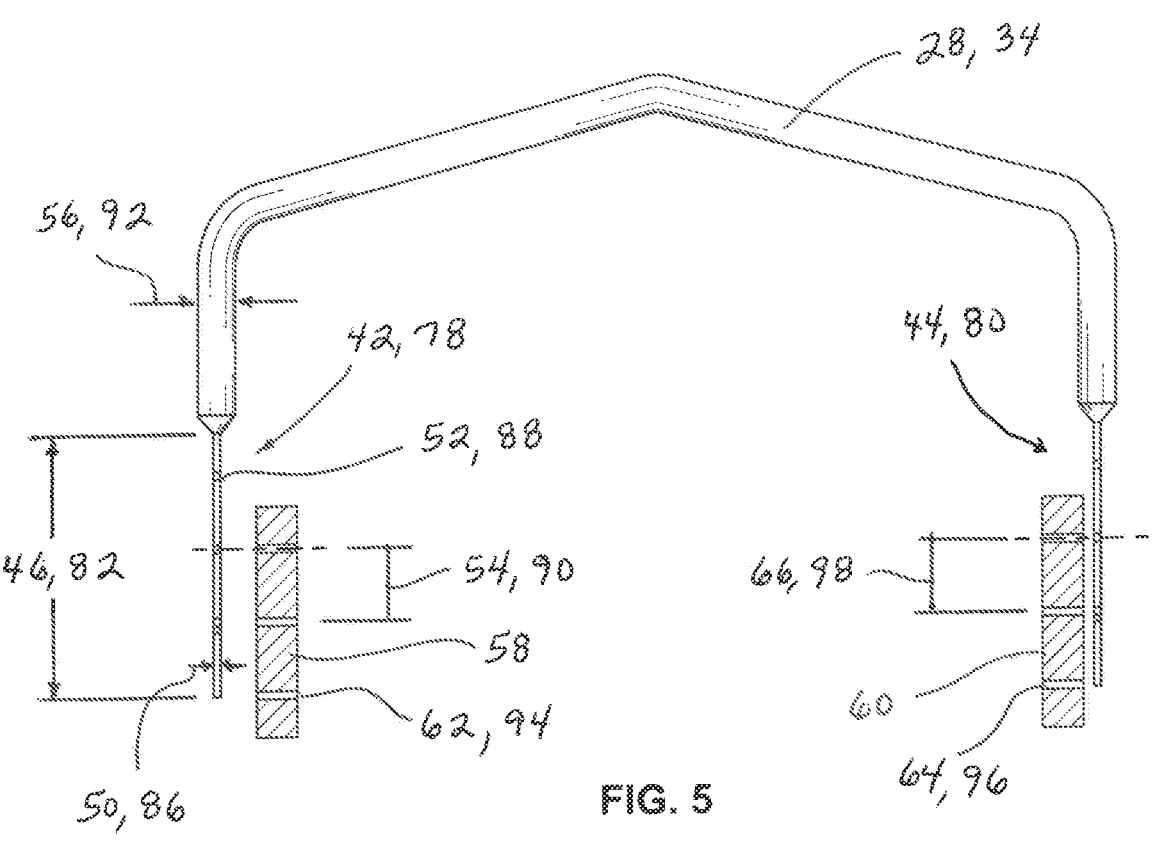
FIG. 5 is a front perspective view of the front handle and back handle and, in particular, illustrating the opposed front handle legs and opposed back handle legs, and respective mounting holes, in alignment with the opposed supports or plates, and receiving holes, that are fixedly secured to the lawn mower.
Figure 6:
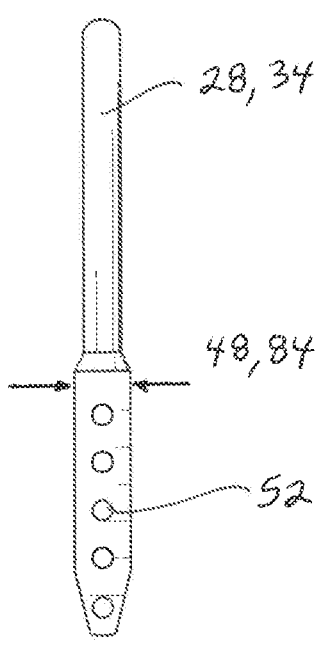
FIG. 6 is a side perspective view of the front handle and back handle and, in particular, illustrating the opposed front handle legs and opposed back handle legs, and respective mounting holes, in alignment with the opposed supports or plates, and receiving holes, that are fixedly secured to the lawn mower.

Referring to FIG. 2, the front handle 28 has front handle opposed legs 42 and 44 (see FIG. 5). Each of these opposed legs 42 and 44 have a length 46 (see FIG. 5), a width 48 (see FIG. 6), a thickness 50, and a plurality of mounting holes 52 each separated by a distance or spacing 54. In the preferred embodiment, the thickness 50 of each of the opposed legs 42 and 44 remains substantially the same for the entire length 46 and is less than ⅓ of the thickness 56 of the front handle 28. In this manner, the thickness 56 of the front handle 28 enables use by the operator 24 while providing efficient attachment to the lawn mower 20, and specifically, opposed supports or plates 58 and 60 (see FIG. 5) (as further described herein).

The opposed supports or plates 58 and 60 are each fixedly secured to the frame of the lawn mower 20, are situated in a vertical orientation relative to the lawn mower 20, and extend outwardly from the operator console 26 parallel to one another. Each opposed support or plate 58 is provided with a plurality of receiving holes 62 and opposed support or plate 60 is provided with a plurality of receiving holes 64; with each of the plurality of receiving holes 62 and plurality of receiving holes 64 situated in a vertical orientation are separated by a distance or spacing 66. In the preferred embodiment, the distance or spacing of 66 is substantially equal to the distance or spacing 54 for the front handle opposed legs 42 and 44. Alternatively, the distance or spacing of 66 may be larger or smaller than the distance or spacing 54 for the front handle opposed legs 42 and 44 as this would accommodate larger or smaller height adjustment of the front handle 28 as described herein.

As illustrated in FIG. 2, the front handle 28 is releasably secured or attached to the support or plate 58 whereby, for example, one of the plurality of mounting hole 52 of the front handle opposed leg 42 is in alignment with one of the plurality of receiving holes 62 of the support or plate 58 and a first nut and bolt 68 is inserted through the one of the plurality of mounting hole 52 in alignment with one of the plurality of receiving holes 62 to releasably secure the front handle opposed leg 42 to the support or plate 58.

For additional securement, another of the one of the plurality of mounting holes 52 of the front handle opposed leg 42 can be aligned with another of the plurality of receiving holes 62 of the support or plate 58 and a second nut and bolt 70 can be inserted through this another of the one of the plurality of mounting hole 52 with this another of the one of the plurality of receiving holes 62 to further releasably secure the front handle opposed leg 42 to the support or plate 58.

Likewise, the front handle opposed leg 44 is releasably secured to the opposed support or plate 60 in the same manner.

In this manner, upon releasably securing the front handle 28, and front handle opposed legs 42 and 44, to the opposed support or plate 58 and 60, the front handle 28 is situated at a first height 72, as illustrated in FIG. 2, to the operator 24.

Alternatively, any other means for releasably securing the front handle opposed legs 42 and 44 to the opposed support or plates 58 and 60 known to one skilled in the art may be used.

In the preferred embodiment, the front handle 28 may be adjusted and moved to a second height 74, as illustrated in FIG. 3, to the operator 24. In this manner, by removing the first nut and bolt 68 and the second nut and bolt 70, the front handle opposed legs 42 and 44 may be moved such that the next of the of the plurality of mounting holes 52 are in alignment with the next one of the plurality of receiving holes 62 and 64 in the opposed supports or plates 58 and 60 (collectively, the combination of the two mounting holes 52 of the opposed legs 42 and 44 and the combination of the two receiving holes 62 and 64 in the opposed support or plate 58 and 60 are referred to herein as "next first set"); and which, upon re-securing the first nut and bolt 68 and second nut and bolt 70, releasably secures the front handle opposed legs 42 and 44 to the supports or plates 58 and 60 at the second height 74, as illustrated in FIG. 3.

In the preferred embodiment, the front handle 28 may be adjusted and moved to a third height 76, as illustrated in FIG. 4, to the operator 24. In this manner, by removing the first nut and bolt 68 and the second nut and bolt 70, the front handle opposed legs 42 and 44 may be moved such that the next of the plurality of mounting holes 52 are in alignment with the next one of the plurality of receiving holes 62 and 64 in the opposed supports or plates 58 and 60 (collectively, the combination of the two mounting holes 52 of the opposed legs 42 and 44 and the combination of the two receiving holes 62 in the opposed support or plate 58 and 60 are referred to herein as "next second set"); and which, upon re-securing the first nut and bolt 68 and second nut and bolt 70, releasably secures the front handle opposed leg 42 to the support or plate 58 at the third height 74, as illustrated in FIG. 4.

In each of the first height 72, the second height 74, and the third height 76, the height differences between them is defined by the distance or spacing 54 between the plurality of mounting holes 52.

Additionally, in the preferred embodiment, each of the front handle opposed legs 42 and 44 are situated at the same first height 72, second height 74, and third height 76 at the same time. Alternatively, it is contemplated that it is possible that the front handle opposed leg 42 can be situated at one of the first height 72, the second height 74, and the third height 76 while the front handle opposed leg 44 is situated at, one of the other differing heights.

Referring back to FIG. 2, the back handle 34 has back handle opposed legs 78 and 80 (see FIG. 5). Each of these opposed legs 78 and 80 have a length 82 (see FIG. 5), a width 84 (see FIG. 6), a thickness 86, and a plurality of mounting holes 88 each separated by a distance or spacing 90. In the preferred embodiment, the thickness 86 of each of the opposed legs 78 and 80 remains substantially the same for the entire length 82 and is less than ⅓ of the thickness 92 of the back handle 34. In this manner, the thickness 92 of the back handle 34 enables use by the operator 24 while providing efficient attachment to the lawn mower 20, and specifically, opposed supports or plates 58 and 60 (see FIG. 5) (as further described herein).

Each opposed support or plate 58 is provided with a (second set) of plurality of receiving holes 94 and opposed support or plate 60 is provided with a (second set) of plurality of receiving holes 96; with each of the plurality of receiving holes 94 and plurality of receiving holes 96 situated in a vertical orientation are separated by a distance or spacing 98. In the preferred embodiment, the distance or spacing of 98 is substantially equal to the distance or spacing 90 for the back handle opposed legs 78 and 80. Alternatively, the distance or spacing of 98 may be larger or smaller than the distance or spacing 90 for the back handle opposed legs 78 and 80 as this would accommodate larger or smaller height adjustment of the back handle 34 as described herein.

As illustrated in FIG. 2, the back handle 34 is releasably secured or attached to the support or plate 58 whereby, for example, one of the plurality of mounting bole 88 of the back handle opposed leg 78 is in alignment with one of the plurality of receiving holes 94 of the support or plate 58 and a third nut and bolt 100 is inserted through the one of the plurality of mounting hole 88 in alignment with one of the plurality of receiving holes 94 to releasably secure the back handle opposed leg 78 to the support or plate 58.

For additional securement, another of the one of the plurality of mounting holes 88 of the back handle opposed leg 78 can be aligned with another of the plurality of receiving holes 94 of the support or plate 58 and a fourth nut and bolt 102 can be inserted through this another of the one of the plurality of mounting hole 88 with this another of the plurality of receiving holes 94 to further releasably secure the back handle opposed leg 78 to the support or plate 58.

Likewise, the back handle opposed leg 80 is releasably secured to the opposed support or plate 60 in the same manner.

In this manner, upon releasably securing the back handle 34, and back handle opposed legs 78 and 80, to the opposed support or plate 58 and 60, the back handle 34 is situated at a first height 104, as illustrated in FIG. 2, to the operator 24.

Alternatively, any other means for releasably securing the back handle opposed legs 78 and 80 to the opposed support or plates 58 and 60 known to one skilled in the art may be used.

In the preferred embodiment, the back handle 34 may be adjusted and moved to a second height 74, as illustrated in FIG. 3, to the operator 24. In this manner, by removing the third nut and bolt 100 and the fourth nut and bolt 102, the back handle opposed legs 78 and 80 may be moved such that the next of the of the plurality of mounting holes 88 are in alignment with the next one of the plurality of receiving holes 94 and 96 in the opposed supports or plates 58 and 60 (collectively, the combination of the two mounting holes 88 of the back handle opposed legs 78 and 80 and the combination of the two receiving holes 94 and 96 in the opposed supports or plates 58 and 60 are referred to herein as "next first set"); and which, upon re-securing the third nut and bolt 100 and fourth nut and bolt 102, releasably secures the back handle opposed legs 78 and 80 to the supports or plates 58 and 60 at the second height 106, as illustrated in FIG. 3.

In the preferred embodiment, the back handle 34 may be adjusted and moved to a third height 108, as illustrated in FIG. 4, to the operator 24. In this manner, by removing the third nut and bolt 100 and the fourth shut and bolt 102, the back handle opposed legs 78 and 80 may be moved such that the next of the plurality of mounting holes 88 are in alignment with the next one of the plurality of receiving holes 94 and 96 in the opposed supports or plates 58 and 60 (collectively, the combination of the two mounting holes 88 of the back handle opposed legs 78 and 80 and the combination of the two receiving holes 94 and 96 in the opposed supports or plates 58 and 60 are referred to herein as "next second set"); and which, upon re-securing the third nut and bolt 100 and fourth nut and bolt 102, releasably secures the back handle opposed legs 78 and 80 to the supports or plates 58 and 60 at the third height 108, as illustrated in FIG. 4.

In each of the first height 104 the second height 106, and the third height 108, the height differences between them is defined by the distance or spacing 90 between the plurality of mounting holes 88.

Additionally, in the preferred embodiment, each of the back handle opposed legs 78 and 80 are situated at the same first height 104, second height 106, and third height 108 at the same time. Alternatively, it is contemplated that, it is possible that, the back handle opposed leg 78 can be situated at one of the first height 104, the second height 106, and the third height 108 while the back handle opposed leg 80 is situated at one of the other differing heights.

Also, the front handle 28 and the first height 72, the second height 74, and the third height 76 of the front handle opposed legs 42 and 44 can be at the same or different heights as the back handle 34 and the first height 104, the second height 106, and the third height 108 of the back handle opposed legs 78 and 80.

Figure 7:
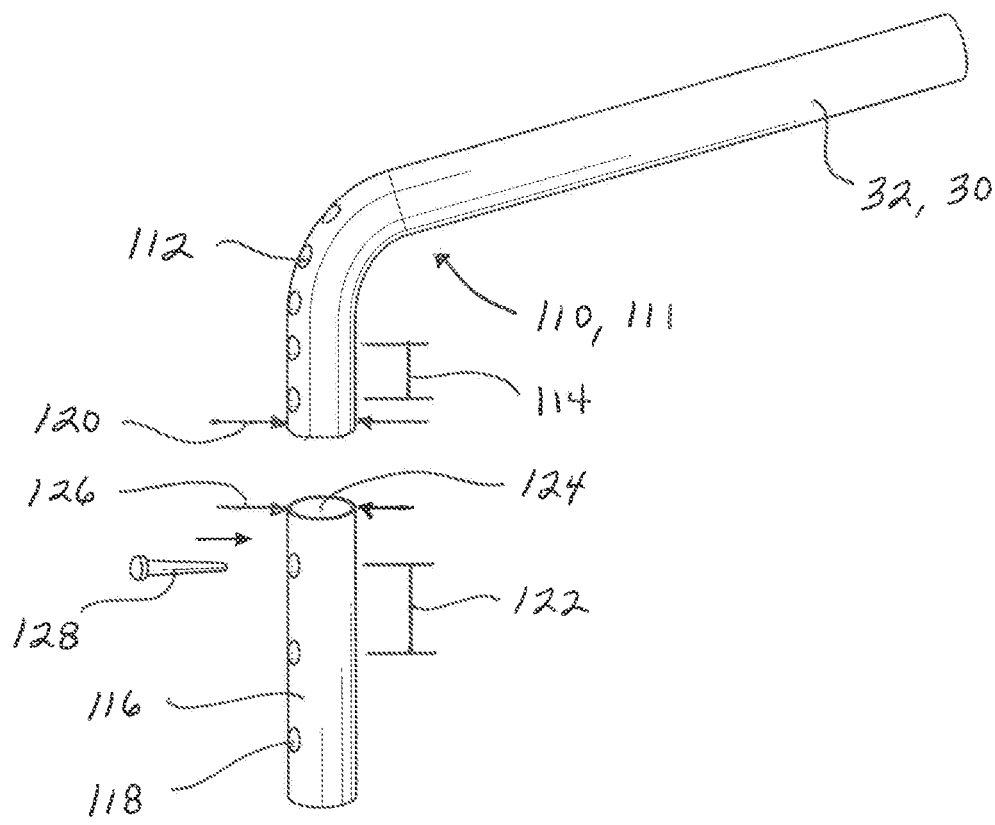
FIG. 7 is a front perspective, exploded view of the right control handle lever and left control handle lever and, in particular, illustrating the control lever legs, and respective pin holes, in alignment with the opposed connect sleeves, and receiving holes, that are fixedly secured to the lawn mower.
Figure 8:
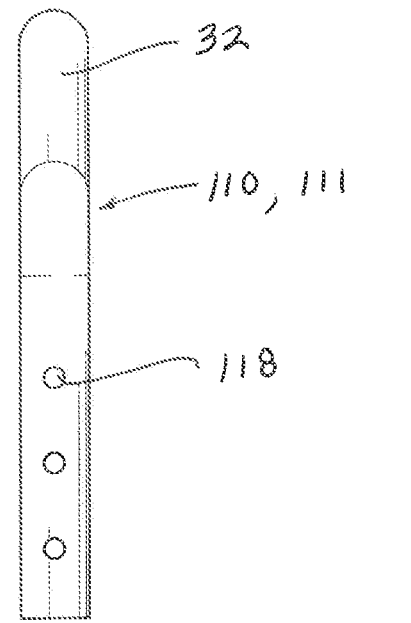
FIG. 8 is a side perspective view of the right control handle lever and left, control handle lever and, in particular, illustrating the control lever legs, and respective pin holes, in alignment with the opposed connect sleeves, and receiving holes, that are fixedly secured to the lawn mower.

Referring back to FIG. 2, the right control handle lever 32 has a control lever leg 110 having a plurality of pin holes 112 each separated by a distance or spacing 114 (see FIG. 7). The control lever leg 110 is also hollow, circular in shape, and has a diameter 120. A connect sleeve 116 is fixedly secured to the lawn mower 20, is situated in a vertical orientation relative to the lawn mower, is circular in shape and has an opening 124 having a diameter 126 and is further provided with a plurality of receiving holes 118 with each of the plurality of receiving holes 118 situated in a vertical orientation and separated by a distance or spacing 122. In the preferred embodiment, the distance or spacing of 114 for the control lever leg 110 is less than the distance or spacing 122 for the connect sleeve 116. Alternatively, the distance or spacing of 118 may be larger or smaller than the distance or spacing 114 as this would accommodate larger or smaller height adjustment of the right control handle lever 32 as described herein. Additionally, the diameter 120 of the control lever leg 110 is larger than the diameter 126 of the connect, sleeve 116. In an alternate embodiment, the diameter 120 of the control lever leg 110 may be smaller than the diameter 126 of the connect sleeve 116 provided the control lever leg 110 is releasably secured or attached to the connect sleeve 116 in the same manner as otherwise described herein.

As illustrated in FIG. 2, the right control handle lever 32 is releasably secured or attached to the connect sleeve 116 whereby, for example, the control lever leg 110 and diameter 120 is inserted over the connect sleeve 116 and diameter 126 such that the control lever leg 110 is traversing the exterior of the connect sleeve 116. Then, as this occurs, when one of the plurality of pin holes 112 of the control lever leg 110 is in alignment with one of the plurality of receiving holes 118 of the connect sleeve 116, a ball lock pin 128 is inserted through the one of the plurality of pin holes 112 in alignment with one of the plurality of receiving holes 118 to thereby releasably secure the control lever leg 110 to the connect sleeve 116.

Likewise, the left control handle lever 30 having a control lever leg 111 that is identical to the control lever leg 110 is releasably secured in the same manner to an opposed connect sleeve 117 which, other than being fixedly secured to the opposite side of the lawn mower 20, is identical to the connect sleeve 116.

In this manner, upon releasably securing the right control handle lever 32 and control lever leg 110 to the connect sleeve 116, the right control handle lever 32 is situated at a first height 130, as illustrated in FIG. 2, to the operator 24. Further, upon releasably securing the left control handle lever 30 and control lever leg 111 to the connect sleeve 117, the left control handle lever 30 is likewise situated at a first height 131, as illustrated in FIG. 2, to the operator 24.

Alternatively, any other means for releasably securing the right control handle lever 32 and control lever leg 110 to the connect sleeve 116 known to one skilled in the art may be used.

In the preferred embodiment, the right control handle lever 32 may be adjusted and moved to a second height 132, as illustrated in FIG. 3, to the operator 24. In this manner, by removing the ball lock pin 128, the control lever leg 110 may traverse along the exterior of the connect sleeve 116 and moved such that the next of the of the plurality of pin holes 112 are in alignment with the next one, or desired one, of the plurality of receiving holes 118 in the connect sleeve 116; and which, upon re-securing the ball lock pin 128, releasably secures the right control handle lever 32 and control lever leg 110 to the connect sleeve 116 at the second height 132, as illustrated in FIG. 3.

In the preferred embodiment, the right control handle lever 32 may be adjusted and moved to a third height 134, as illustrated in FIG. 4, to the operator 24. In this manner, by removing the ball lock pin 128, the control lever leg 110 may traverse along the exterior of the connect sleeve 116 and moved such that the next of the of the plurality of pin holes 112 are in alignment with the next one, or desired one, of the plurality of receiving holes 118 in the connect sleeve 116; and which, upon re-securing the ball lock pin 128, releasably secures the right control handle lever 32 and control lever leg 110 to the connect sleeve 116 at the third height 132, as illustrated in FIG. 4.

In each of the first height 130, the second height 132, and the third height 134, the height differences between them is defined by the distance or spacing 122 between the plurality of pin holes 114.

Additionally, in the preferred embodiment, the left control handle lever 30 and control lever leg 111 are likewise adjusted and situated at the first height 131, a second height 136, as illustrated in FIG. 3; and a third height. 138, as illustrated in FIG. 4.

In the preferred embodiment, the first height 130, the second height 132, and the third height 133 of the right control handle lever 32 is substantially the same as the first height 131, the second height 136, and the third height 138 of the left control handle lever 30. In an alternate embodiment, the first height 130, the second height 132, and the third height 133 of the right control handle lever 32 of the right control handle lever 32 may be higher or lower than the first height 131, the second height 136, and the third height 138 of the left control handle lever 30.

In a further alternate embodiment, the height of the front handle 28, the back handle 34, the left control handle lever 30, and the right control handle lever 32 can be adjusted by any other means known to one skilled in the art; and further, provided that this invention is used as described herein, may also be used in connection with any other type of lawn mower.

Thus, there has been provided a method and apparatus for height adjustable handles for lawn mowers. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the disclosure contained herein and appended claims.

What is claimed is:

1. A device for a self-propelled lawn mower, comprising:
a first plate and a second plate each fixedly secured to the self-propelled lawn mower;
the first plate having a first receiving hole, a second receiving hole, a third receiving hole, and a fourth receiving hole;
the second plate having a fifth receiving hole, a sixth receiving hole, a seventh receiving hole, and an eighth receiving hole;
a first sleeve and a second sleeve each fixedly secured to the self-propelled lawn mower;
a front handle having opposed legs with each opposing leg of the front handle having a first mounting hole, a second mounting hole, a third mounting hole, a fourth mounting hole, and a fifth mounting hole;
one of the opposed legs of the front handle releasably fixed to the first plate by securing the first mounting hole of one of the opposed legs of the front handle in alignment with the first receiving hole of the first plate and the third mounting hole of one of the opposed s of t front handle in alignment with the second receiving hole of the first plate with the second mounting hole of one of the opposed legs of the front handle remaining open to create a first front handle height and the other of the opposed legs of the front handle fixedly secured to the second plate by securing the first mounting hole of the of the opposed legs of the front handle in alignment with the fifth receiving hole of the second plate and the third mounting hole of the other of the opposed of the front handle in alignment with the receiving hole of the second plate with the second mounting hole of the other of the opposed legs of the front handle remaining open to create an opposing first front handle height;
the one of the opposed legs of the front handle is moved and releasably fixed to a first different front handle location on the first plate by securing the second mounting hole of one of the opposed legs of the front handle in alignment with the first receiving hole of the first plate and the fourth mounting hole of one of the opposed legs of the front handle in alignment with second receiving hole of the first plate with the third mounting hole of one of the opposed legs of the front handle remaining open to create a second front handle height and the other of the opposed legs of the front handle is moved and releasably fixed to an opposing first different front handle location on the second plate by securing the second mounting hole of the other of the opposed legs of the front handle in alignment with the fifth receiving hole of the second plate and the fourth mounting hole of the other of the or ed legs of the front handle in alignment with the sixth receiving hole of the second plate with the d mounting hole of the the opposed legs of the front handle remaining open to create an opposing second front handle height;
the one of the opposed legs of the front handle is moved and releasably fixed to a second different front handle location on the first plate by securing the third mounting hole of one of the opposed legs of the front handle in alignment with the first receiving hole of the first plate and the fifth mounting hole of one of the opposed legs of the front handle in alignment with the second receiving hole the first plate with the fourth mounting hole of one of the opposed legs of the front handle remaining pen to create a third front handle height and the other of the opposed legs of the front handle is moved and releasably fixed to an opposing second different front handle location on the second plate by securing the third mounting hole of the other of the opposed legs of the front handle in alignment with the fifth receiving hole of the second plate and the fifth mounting hole of the other of the opposed legs of the front handle in alignment with receiving hole of the second plate with the fourth mounting hole of the other the opposed legs of the front handle remaining open to create an opposing third front handle height;

a right control handle lever releasably fixed to the first sleeve to create a first right control handle height;

a left control handle lever releasably fixed to the second sleeve to create a first left control handle height;

a back handle having opposed legs with each op of the back handle having a first mounting hole, a second mounting hole, a third mounting hole, a fourth mounting hole, and a fifth mounting hole;

one of the opposed legs of the back handle releasably fixed to the first plate by securing the first mounting hole of one of the of posed legs of the back handle in alignment with the third receiving hole of the first plate and the third mounting hole of one of the opposed legs of the back handle in alignment with the fourth receiving hole of the first plate with the second mounting hole of one of the opposed legs of the back handle remaining open to create a first back handle height and the other of the opposed legs of the back handle fixedly secured to the second plate by securing the first mounting hole of the other of the opposed legs of the back handle in alignment with the seventh receiving hole of the second plate and the third mounting hole of the other of the opposed legs of the back handle in alignment with the eighth receiving hole of the second plate with the second mounting hole of the other of the opposed legs of the front handle remaining open to create an opposing first back handle height;

the one of the opposed legs of the back handle is moved and fixed to a first different back handle location on the first plate by securing the second mounting hole of one of the opposed legs of the b ick handle in alignment with the third receiving hole of the first plate and the fourth mounting hole of one of the op posed legs of the back handle in alignment with the fourth receiving hole of the first plate with the third mounting hole of one of the opposed legs of the back handle remaining open to create a second back e height and the other of the opposed legs of the back handle is moved and releasably fixed to an opposing first different back handle location on the second plate by securing the second mounting hole of the other of the opposed legs of the back handle in ent with seventh receiving hole of the second plate and the fourth mounting hole of the other of the opposed legs of the back handle in alignment with the eighth receiving hole of the second plate with the third mounting hole of the other of the opposed legs of the back handle remaining open to create an opposing second back handle height;

the one of the opposed legs of the back handle is moved and releasably fixed to a second different back handle location on the first plate securing the third mounting hole of one of the opposed legs of the back handle in alignment with the third receiving hole of the first plate and the fifth mounting hole of one of the opposed legs of the back handle in alignment with the fourth receiving hole of the first plate with the fourth mounting hole of one of the opposed legs of the back handle remaining open to create a third back handle height and the other of the opposed legs of the back handle is moved and releasably fixed to an opposing second different back hand location on the second plate by securing the third mounting hole of the other of the opposed lets of the back handle in alignment with the seventh receiving hole of the second plate and the fifth mounting hole of the other of opposed legs of the back handle in alignment with the eighth receiving hole of the second plate with the forth mounting hole of the other of the opposed legs of the back handle remaining open to create an opposing third back handle height;

each of the opposed legs of the front handle has a thickness that is less than one-third the thickness of the front handle;

each of the opposed legs of the back handle has a thickness that is less than one-third the thickness of the back handle;

wherein the front handle and the back handle are situated in a vertical orientation and adjacent to the right control handle and the left control handle;

wherein the right control handle and the left control handle are situated in a vertical orientation and parallel to one another.

2. The device of claim 1 wherein the first front handle height is the same as the opposing first front handle height.

3. The device of claim 2 wherein the first right control handle height is the same as the first left control handle height.

4. The device of claim 1 wherein the first back handle height is the same as the opposing first back handle height.

5. The device of claim 1 wherein the right control handle lever is moved and releasably fixed to a different location on the first sleeve to create a second right control handle height.

6. The device of claim 1 wherein the left control handle lever is moved and releasably fixed to a different location on the second sleeve to create a second left control handle height.

7. A device for attachment to a lawn mower having a front end and a rear end and situated in a horizontal plane, comprising:

an operator platform situated adjacent to the rear end of the lawn mower;

a front handle releasably fixed to a first plate and a second plate with the first plate and the second plate each fixedly secured to the lawn mower;

the first plate having a first receiving hole, a second receiving hole, and a third receiving hole;

the second plate having a fourth receiving hole, a fifth receiving hole, and a sixth receiving hole;

the front handle having opposed legs with each opposing let of the front handle having a first mounting hole, a second mounting hole, a third mounting hole, and fourth mounting hole;

one of the opposed legs of the front handle releasably fixed to the first plate by securing the first mounting hole of one of the opposed e front handle in alignment with the first receiving hole of the first plate and the second mounting hole of one of the opposed legs of the front handle in alignment with the second receiving hole of the first plate to create a first front handle height and the other of the opposed legs of the front handle fixedly secured to the second plate by securing the first mounting hole of the other of the opposed legs of the front handle in alignment with the fourth receiving hole of the second plate and the second mounting hole of the other of the opposed legs of the front handle in alignment with the fifth receiving hole of the second plate to create an opposing first front handle height; and the one of the opposed legs of the front handle is moved and releasably fixed to a first different front handle location on the first plate ring the third mounting hole of one of the opposed legs of the front handle in alignment with the second receiving hole of the first plate and the fourth mounting hole of one of the posed eps of the front handle in alignment with the third receiving hole of the first plate to create a second front handle height and the other of the opposed legs of the front handle is moved and r ably ix an opposing first different front handle location on the second plate by securing the third mounting hole of the other of the opposed legs of the front handle in alignment with the receiving hole of the second plate and the fourth mounting hole of the other of the opposed legs of the front handle in alignment with the sixth receiving hole of the second plate to create an opposing second front handle height;

a right control handle lever releasably fixed to a connect sleeve at a first right control handle height; and means for moving the right control handle lever to be releasably fixed to the connect sleeve at a second right control handle height.

8. The device of claim 7 wherein the front handle and the right control handle lever are each situated in a vertical orientation relative to the horizontal plane of the lawn mower and adjacent to one another.

9. The device of claim 7 wherein the first front handle height is the same as the first right control handle height.

10. The device of claim 7 wherein the plate is situated in a vertical orientation relative to the horizontal plane of the lawn mower.

11. The device of claim 7 wherein the connect sleeve is situated in a vertical orientation relative to the ground.

12. The device of claim 7 and further comprising a back handle releasably fixed to the plate at a first back handle height.

13. The device of claim 7 and further comprising a left control handle lever releasably fixed to a second connect sleeve at a first left control handle height.

* * * * *